(12) United States Patent
Shatz et al.

(10) Patent No.: US 7,806,596 B2
(45) Date of Patent: Oct. 5, 2010

(54) HIGH SPEED BEARING SYSTEM WITH BIND-FREE AXIAL DISPLACEMENT

(75) Inventors: Mark N. Shatz, San Diego, CA (US); Eric J. Alexander, San Diego, CA (US); Gordon F. Jewess, San Diego, CA (US); James J. McLaughlin, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 528 days.

(21) Appl. No.: 11/897,834

(22) Filed: Aug. 31, 2007

(65) Prior Publication Data

US 2009/0060405 A1    Mar. 5, 2009

(51) Int. Cl.
*F16C 19/08* (2006.01)
*F16C 33/16* (2006.01)

(52) U.S. Cl. .................. 384/493; 384/462; 384/613; 384/626; 60/39.34

(58) Field of Classification Search ............. 384/126, 384/462–463, 492–493, 517, 535, 613, 620, 384/625; 60/39.34; 148/242
See application file for complete search history.

(56) References Cited

U.S. PATENT DOCUMENTS

| | | | | |
|---|---|---|---|---|
| 2,892,741 A * | 6/1959 | Spengler et al. | ............. | 148/242 |
| 3,198,735 A * | 8/1965 | Devine et al. | ............. | 384/463 |
| 4,480,881 A * | 11/1984 | Fujimori | ............. | 384/613 |
| 4,486,055 A * | 12/1984 | Rohloff | ............. | 384/535 |
| 4,641,978 A * | 2/1987 | Kapich | ............. | 384/624 |
| 5,316,393 A * | 5/1994 | Daugherty | ............. | 384/517 |
| 5,954,880 A * | 9/1999 | Aoki et al. | ............. | 118/423 |
| 6,261,061 B1 * | 7/2001 | Pfaffenberger | ............. | 384/492 |
| 6,783,319 B2 * | 8/2004 | Doerflein et al. | ............. | 415/1 |
| 6,918,746 B2 * | 7/2005 | Duerr et al. | ............. | 415/206 |
| 6,931,862 B2 * | 8/2005 | Harris | ............. | 60/804 |
| 7,255,933 B2 * | 8/2007 | Sato et al. | ............. | 384/463 |
| 7,435,004 B2 * | 10/2008 | Singh et al. | ............. | 384/448 |
| 2006/0147138 A1 * | 7/2006 | Johal et al. | ............. | 384/276 |
| 2008/0135336 A1 * | 6/2008 | Jewess et al. | ............. | 184/6.11 |

FOREIGN PATENT DOCUMENTS

| | | | | |
|---|---|---|---|---|
| DE | 3542077 A1 | * | 7/1986 |
| GB | 2210767 A | * | 6/1989 |
| GB | 2281601 A | * | 3/1995 |
| JP | 63289317 A | * | 11/1988 |
| JP | 06335199 A | * | 12/1994 |
| JP | 08093774 A | * | 4/1996 |
| JP | 2005133881 A | * | 5/2005 |

* cited by examiner

*Primary Examiner*—Marcus Charles
(74) *Attorney, Agent, or Firm*—Stephen G. Mican

(57) ABSTRACT

A rotary bearing system that supports a shaft for rotating machinery in a housing comprises: at least one stationary rotary bearing mounted in the housing for supporting a respective journal of the shaft in a desired axial and radial alignment; at least one slidable rotary bearing, with an outer surface mounted within a respective inner support surface of the housing to form a respective linear bearing such that each slidable bearing may slide axially along the inner support surface of the housing, for supporting another respective journal of the shaft with the desired radial alignment; and at least one layer of a crystalline material that exhibits a high degree of basal cleavage bonded to at least one of the linear bearing surfaces; wherein each layer of crystalline material allows each slidable rotary bearing to slide axially along each respective linear bearing to compensate for differences in the coefficient of expansion of the housing and the shaft so as to prevent the bearing system from binding due to extreme environmental conditions.

21 Claims, 2 Drawing Sheets

US 7,806,596 B2

HIGH SPEED BEARING SYSTEM WITH BIND-FREE AXIAL DISPLACEMENT

The invention occurred with government support under Contract No.: F08635-03-C0002 awarded by the United States Air Force. The government may have certain rights in the invention.

FIELD OF THE INVENTION

The invention relates to high speed bearing systems for rotating components, and more particularly to high speed bearing systems with variable axial displacement between multiple bearings for rotating components.

BACKGROUND OF THE INVENTION

Machinery with high speed rotating components that experience a wide range of environmental conditions, such as miniature gas turbine or turbojet engines, require bearing systems for such rotating components that achieve reliable operation with minimal cost, particularly since many such miniature engines are of the single-use expendable type.

The bearing system in such miniature gas turbine engines usually supports a rotor shaft for the rotating components. It comprises an aft rotary bearing to support an aft journal for the rotating components and at least one forward rotary bearing to support a corresponding shaft forward section. A housing for the engine generally attaches to an outer race of the aft bearing to hold it in a fixed axial and radial position. To compensate for any change in length between the shaft aft section and the shaft forward section due to changes in environmental conditions, such as ambient or operating temperatures, the housing fixes the radial position of an outer race for the forward bearing but allows axial freedom of movement of the outer race to allow the bearing system to compensate for such changes in axial length between the shaft aft section and the shaft forward section. This allows the bearing system to support the rotating components without bearing seizure due to environmental changes in axial length between the shaft aft section and the shaft forward section. In other words, the bearing system includes a linear bearing between the housing and the outer race of the forward bearing.

It is important that this linear bearing does not itself seize up before or during operation of the engine. It is possible to lubricate this bearing with the engine lubrication system. However, the environmental condition for the engine before starting may be so extreme, such as at a very low ambient temperature, that due to differences in the coefficient of expansion between the housing material and the material of the forward bearing outer race, the clearance between their mating surfaces may diminish to the point that they bind or seize together. In this case, any sort of lubrication provided by the engine lubrication system is useless to free up these surfaces, and the aft and forward bearings may then exhibit a degree of axial tension that causes them severe wear or seizure that in turn may cause premature engine failure.

SUMMARY OF THE INVENTION

The invention generally comprises a rotary bearing system that supports a shaft for rotating machinery in a housing, comprising: at least one stationary rotary bearing mounted in the housing for supporting a respective journal of the shaft in a desired axial and radial alignment; at least one slidable rotary bearing, with an outer surface mounted within a respective inner support surface of the housing to form a respective linear bearing such that each slidable bearing may slide axially along the inner support surface of the housing, for supporting another respective journal of the shaft with the desired radial alignment; and at least one layer of a crystalline material that exhibits a high degree of basal cleavage bonded to at least one of the linear bearing surfaces; wherein each layer of crystalline material allows each slidable rotary bearing to slide axially along each respective linear bearing to compensate for differences in the coefficient of expansion of the housing and the shaft so as to prevent the bearing system from binding due to extreme environmental conditions.

DETAILED DESCRIPTION OF THE INVENTION

Figure 1:
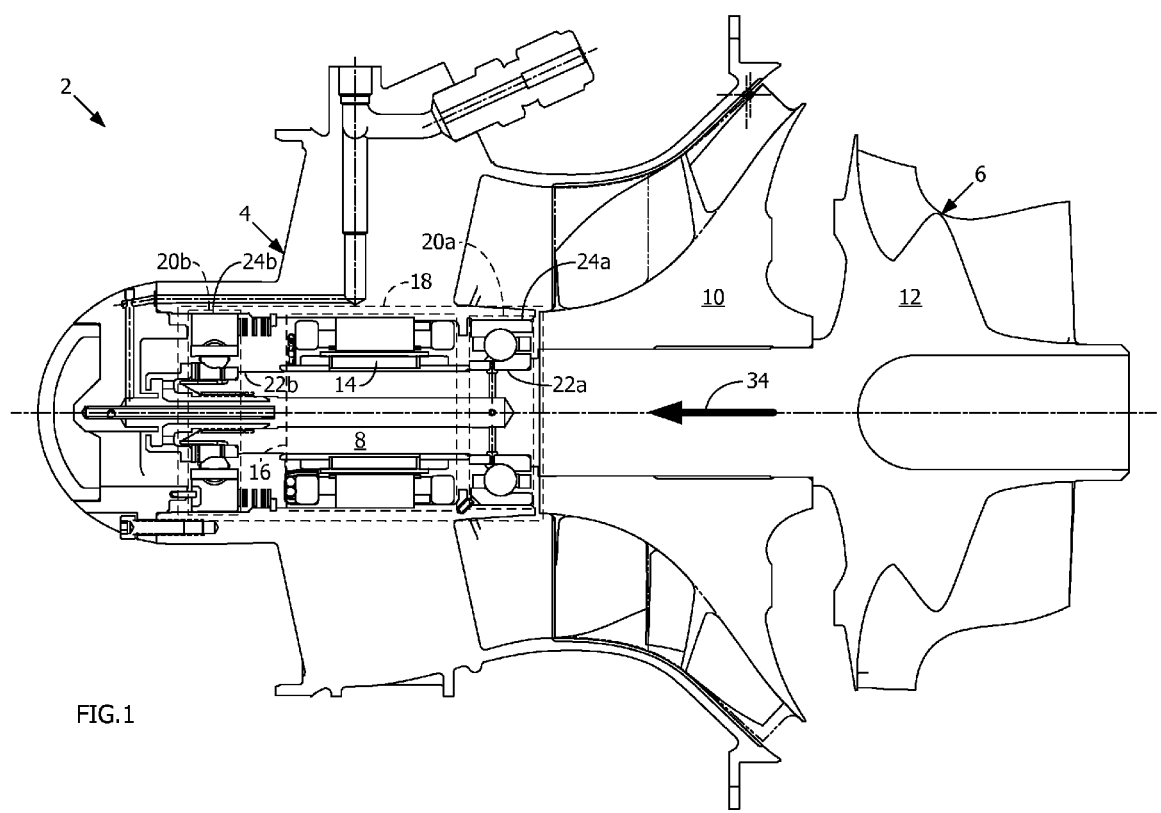
FIG. 1 is a partial cut-away side view of a miniature gas turbine engine according to a possible embodiment of the invention.

FIG. 1 is a partial cut-away side view of a miniature gas turbine engine 2 according to a possible embodiment of the invention. The engine 2 has a housing 4 that encloses at least one rotating engine assembly 6. The rotating assembly 6 may comprise a rotor shaft 8, a compressor wheel 10, a turbine wheel 12 and a permanent magnet (PM) rotor 14 for a permanent magnet generator (PMG) 16 enclosed within the housing 4.

The rotor shaft 8 has a bearing system 18 for the rotating assembly 6 comprising multiple rotary bearings 20 that engage respective shaft journals 22 on the rotor shaft 8. Generally, an aft bearing 20a supports an aft journal 22a of the rotor shaft 8 and a forward bearing 20b supports a forward journal 22b of the rotor shaft 8. The housing 4 retains the bearings 20 along their outer races 24. The housing 4 retains an outer race surface 26 of the outer race 24 for a stationary one of the bearings 20, generally the outer race surface 26a of the outer race 24a for the aft bearing 20a, in axial and radial alignment to fix the axial and radial position of its corresponding aft journal 22a.

To compensate for any change in length between the aft journal 22a and the forward journal 22b due to changes in environmental conditions, such as ambient or operating temperatures, the housing 4 retains the outer race surface 26 for a slidable one of the rotor bearings 20, such as the outer race surface 26b of the outer race 24b for the forward bearing 22b, in radial alignment but allows axial freedom of movement for the outer race 24b to allow the bearing system 18 to compensate for such changes in axial length between the shaft aft section 22a and the shaft forward section 22b. This allows the bearing system 18 to support the rotating assembly 6 without bearing seizure due to environmental changes in axial length between the shaft aft section 22a and the shaft forward section 22b.

Figure 2:
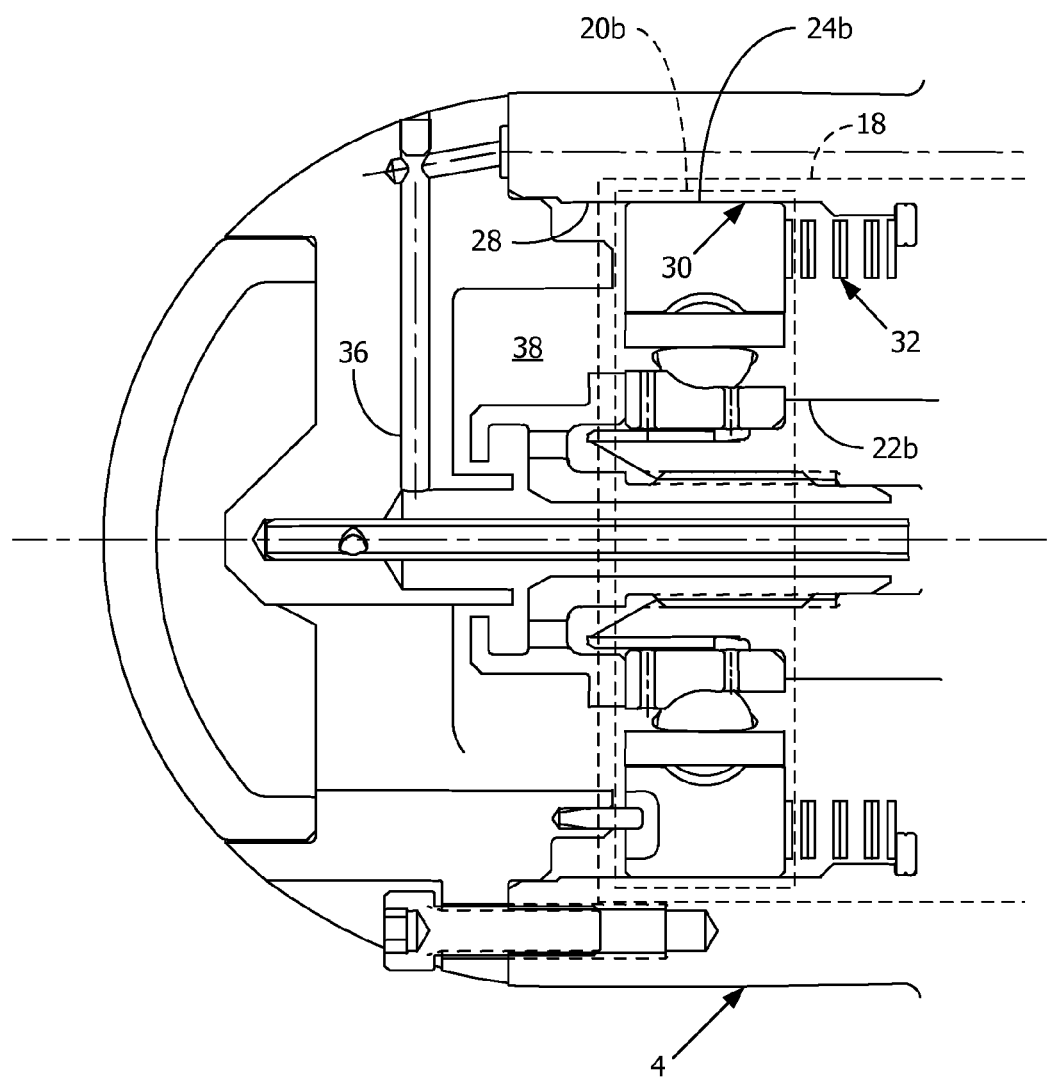
FIG. 2 is a detailed partial cut-away side view of a portion of a bearing system according to a possible embodiment of the invention.

To secure such axial freedom of motion, the outer race surface 26b of the outer race 24b and an inner bore or support surface 28 of the housing 4 mate to form a generally cylindrical linear bearing 30 that allows the outer race surface 26b to slide along the inner support surface 28, as best illustrated in FIG. 2. In other words, the bearing system 18 includes a linear bearing 30 with a bearing surface formed between the housing 4 and the outer race surface 26b of the outer race 24b of the forward bearing 22b. A bias spring 32 serves to apply a predetermined preload to the forward bearing 22b in the same direction as engine thrust applied to the bearings 20 by the rotating engine assembly 6, as indicated in FIG. 1 by arrow 34, upon start of the engine 2.

It is important that the linear bearing 30 does not itself seize up before or during operation of the engine 2. Lubrication oil from the engine 2 flowing through a lubrication oil supply path 36 normally supplies oil to the bearings 20 and to the linear bearing 30 by means of a lubrication oil galley 38 adjacent the linear bearing 30. However, the environmental condition for the engine 2 before starting may be so extreme, such as at a very low ambient temperature, that due to differences in the coefficient of expansion between the material of the housing 4 and the material of the outer race 24b, the clearance between the inner support surface 28 and the outer race surface 26b that comprise the linear bearing 30 may diminish to the point that they bind or seize together. In this case, and any sort of lubrication from the lubrication oil gallery 36 cannot penetrate the linear bearing 30 to free up these surfaces, and the aft and forward bearings 20a and 20b may then exhibit a degree of axial tension that causes them severe wear or seizure upon application of the engine thrust 34. Premature failure of the engine 2 may then result.

To prevent this problem, the inner support surface 28, the outer race surface 26b, or both may comprise a dry surface embedded lubricant. More specifically, they may have a molecular fusion-bonded layer of a crystalline material that exhibits a high degree of basal cleavage to serve as a dry lubricant so that the linear bearing 30 may retain an axial freedom of movement even when the clearance between the inner support surface 28 and the outer race surface 26b is too tight for lubrication oil from the lubrication gallery 36 to penetrate between them.

Examples of such a crystalline material are graphite, molybdenum disulphide and tungsten disulphide. Application of these materials on the inner support surface 28, the outer race surface 26b, or both, by high velocity impingement may result in a durable molecular fusion-bonded layer of dry lubricant that is thin enough to not adversely affect the clearance of the linear bearing 30.

Of course, the rotor shaft 8 may comprise more than two shaft journals 22 supported by more than two respective rotary bearings 20, in which case there may be multiple stationary bearings 20a and multiple slidable rotary bearings 20b. The described embodiment of the invention is only an illustrative implementation of the invention wherein changes and substitutions of the various parts and arrangement thereof are within the scope of the invention as set forth in the attached claims.

The invention claimed is:

1. A rotary bearing system that supports a shaft for rotating machinery in a housing, comprising:
    at least one stationary rotary ball bearing mounted in the housing that engages a respective journal of the shaft in a desired axial and radial alignment;
    at least one slidable rotary ball bearing that engages another respective journal of the shaft with the desired radial alignment, with an outer surface of the slidable rotary ball bearing mounted within a respective inner support surface of the housing to form a respective linear bearing such that the slidable rotary ball bearing may slide axially along the inner support surface of the housing in response to changes in length of the shaft between the shaft journals; and
    at least one molecular fusion-bonded layer of a crystalline material that exhibits a high degree of basal cleavage embedded in at least one of the linear bearing surfaces that lubricates the linear bearing surfaces.

2. The rotary bearing system of claim 1, wherein the crystalline material comprises graphite.

3. The rotary bearing system of claim 1, wherein the crystalline material comprises molybdenum disulphide.

4. The rotary bearing system of claim 1 wherein the crystalline material comprises tungsten disulphide.

5. The rotary bearing system of claim 1, wherein each linear bearing has its respective layer of crystalline material bonded to its respective inner support surface of the housing.

6. The rotary bearing system of claim 1, wherein each linear bearing has its respective layer of crystalline material bonded to the outer surface of its respective slidable rotary ball bearing.

7. The rotary bearing system of claim 1, wherein each linear bearing has two respective layers of crystalline material, one bonded to its respective inner support surface of the housing and the other bonded to the outer surface of its respective slidable rotary ball bearing.

8. The rotary bearing system of claim 1, wherein each layer of crystalline material has a bond to its respective surface formed by high-velocity impingement.

9. A gas turbine engine comprising:
    a housing;
    a compressor wheel;
    a turbine wheel;
    a rotor shaft for the compressor and turbine wheels;
    at least one stationary rotary ball bearing mounted in the housing for supporting a respective journal of the shaft in a desired axial and radial alignment;
    at least one slidable rotary ball bearing that engages another respective journal of the shaft with the desired radial alignment, with an outer surface of the slidable rotary ball bearing mounted within a respective inner support surface of the housing to form a respective linear bearing such that the slidable rotary ball bearing may slide axially along the inner support surface of the housing in response to changes in length of the shaft between the shaft journals; and
    at least one molecular fusion-bonded layer of a crystalline material that exhibits a high degree of basal cleavage embedded in at least one of the linear bearing surfaces that lubricates the linear bearing surfaces.

10. The engine of claim 9, wherein the crystalline material comprises graphite.

11. The engine of claim 9, wherein the crystalline material comprises molybdenum disulphide.

12. The engine of claim 9, wherein the crystalline material comprises tungsten disulphide.

13. The engine of claim 9, wherein each linear bearing has its respective layer of crystalline material bonded to its respective inner support surface of the housing.

14. The engine of claim 9, wherein each linear bearing has its respective layer of crystalline material bonded to the outer surface of its respective slidable rotary ball bearing.

15. The engine of claim 9, wherein each linear bearing has two respective layers of crystalline material, one bonded to its respective inner support surface of the housing and the other bonded to the outer surface of its respective slidable rotary ball bearing.

16. The engine of claim 9, wherein each layer of crystalline material has a bond to its respective surface formed by high-velocity impingement.

17. A method of preventing binding of a rotary bearing system that supports a shaft for rotating machinery in a housing due to changes in environmental conditions, the rotary bearing system comprising at least one stationary rotary ball bearing mounted in the housing that engages a respective journal of the shaft in a desired axial and radial alignment; at least one slidable rotary ball bearing that engages another respective journal of the shaft with the desired radial alignment, with an outer surface mounted within a respective inner support surface of the housing to form a respective linear bearing such that the slidable rotary ball bearing may slide axially along the inner support surface of the housing in response to changes in length of the shaft between the shaft journals; comprising the steps of:

selecting a crystalline material that exhibits a high degree of basal cleavage; and molecular-fusion-bonding the selected crystalline material to at least one of the linear bearing surfaces to form an embedded layer of the crystalline material.

18. The method of claim 17, wherein the crystalline material comprises graphite.

19. The method of claim 17, wherein the crystalline material comprises molybdenum disulphide.

20. The method of claim 17, wherein the crystalline material comprises tungsten disulphide.

21. The method of claim 17, wherein the step of bonding a layer of crystalline material comprises bonding each layer to its respective surface by high-velocity impingement.

* * * * *